United States Patent

Pagnotta et al.

[15] 3,639,722
[45] Feb. 1, 1972

[54] PROCESS FOR JOINING WIRES TO SHEETS OF REFRACTORY MATERIALS

[72] Inventors: Gasper Pagnotta; Allan J. Kiesler, both of Schenectady, N.Y.

[73] Assignee: General Electric Company

[22] Filed: June 17, 1970

[21] Appl. No.: 46,972

[52] U.S. Cl. ............................219/127, 29/25.13, 313/113
[51] Int. Cl. ..................................................B23k 9/00
[58] Field of Search ..............219/127, 118, 85, 86, 99, 121; 29/25.11, 25.13, 504; 313/113, 222, 239, 242

[56] References Cited

UNITED STATES PATENTS

| 3,539,762 | 11/1970 | Swengel et al. | 219/127 |
| 2,979,600 | 4/1961 | Rangabe | 219/127 |
| 3,526,746 | 9/1970 | Campbell | 219/127 |
| 3,441,772 | 4/1969 | Cardwell, Jr. | 313/113 |
| 3,222,567 | 12/1965 | Smith | 313/113 X |
| 3,070,723 | 12/1962 | Peek, Jr. et al. | 313/113 |
| 1,093,197 | 4/1914 | Morrison | 219/121 |

*Primary Examiner*—J. V. Truhe
*Assistant Examiner*—L. A. Schutzman
*Attorney*—Richard R. Brainard, Paul A. Frank, Charles T. Watts, Frank L. Neuhauser, Oscar B. Waddell and Joseph B. Forman

[57] ABSTRACT

A tungsten reflector for a regenerative lamp is secured to a tungsten support rod by cross wire welding a molybdenum wire to the support rod and inserting the free end of the wire into an opening in the sheet and finally arc spot welding the free end of the wire to the side of the sheet facing away from the support rod.

3 Claims, 5 Drawing Figures

PATENTED FEB 1 1972

3,639,722

Inventors:
Gasper Pagnotta,
Allan J. Kiesler,
by
Their Attorney.

PROCESS FOR JOINING WIRES TO SHEETS OF REFRACTORY MATERIALS

The present invention relates generally to the welding art and is more particularly concerned with a new method of rigidly joining together a wire of refractory material and a sheet of refractory material.

It is the present practice in the art to fasten wires or rods to sheets or plates of tungsten or molybdenum by means of spot welds, a longitudinal segment of the wire or rod bearing against the sheet or plate to facilitate such attachment. However, in production operations such as the manufacture of regenerative lamps incorporating tungsten reflectors, this kind of assembly has serious drawbacks. In the first place, spot welds of this type are inherently physically weak because the area of the weld junction is small and the natural geometry of such a weld between hard, brittle metals is conducive to failure. Moreover, it is not possible to determine visually the quality of the welded connection.

By virtue of the present invention, these shortcomings of the prior art can be eliminated. Furthermore, this result can be attained without significantly increasing either the cost or the difficulty of the joining operation and, in fact, without incurring any substantial, offsetting disadvantage.

In brief, the method of this invention centers in the concept of making the attachment between a tungsten sheet and a molybdenum support rod by means of a molybdenum wire joining member cross spotwelded to the support rod and having a free end extending through an opening in the tungsten sheet and arc spot welded to the side of the sheet facing away from the support rod. Thus, the free end of the joining wire is melted during an inert-gas arc spot-welding operation and runs down into the opening through the sheet, and a superficial portion of the tungsten sheet itself is also fused in the area surrounding the opening. Consequently, the weld formed as the metals quickly solidify consists of tungsten and molybdenum and integrally bonds the joining wire to the sheet and closes the opening through the sheet.

This invention is illustrated in the accompanying drawings, in which.

Figure 1:
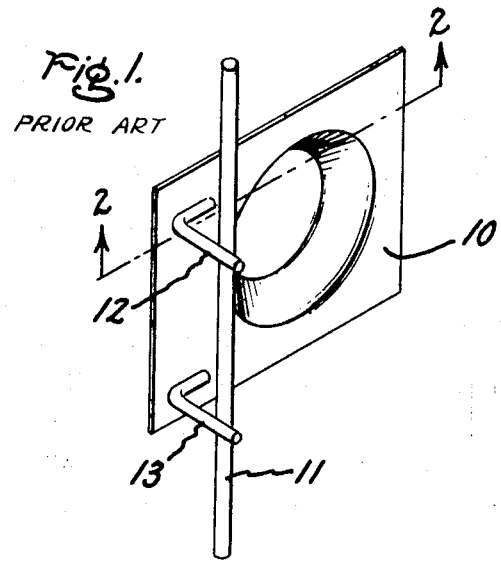
FIG. 1 is a perspective view of a tungsten reflector and support assembly of the type used in regenerative lamps and produced in accordance with the prior art practice mentioned above.

This invention, as indicated above, has special application and utility in the production of reflector assemblies of the type used in regenerative lamps. As shown in FIG. 1, a tungsten reflector 10 in the form of a sheet of tungsten of the order of 0.005 inch thickness is supported within such a lamp by means of a tungsten support rod 11 of 0.025 inch diameter which is spaced from the reflector and attached thereto by two molybdenum wire joining members 12 and 13 also of 0.025 inch diameter. The joining members are generally of elongated L-shape with their short legs in abutting relation to reflector 10 to which they are joined by resistance spot welds as shown at 15. Joining members 12 and 13 are secured to support rod 11 by cross wire welds as shown at 18.

Both the main difficulty which is experienced in production operations and the marked tendency for these FIG. 1 reflector support assemblies to fail unpredictably centers in the weldments between the reflector and the joining members. This is a difficult geometry in which to make a weld attachment and to determine whether the structure would be failure prone under normal conditions of intended use before installing it, for instance, in a regenerative lamp.

Figure 2:
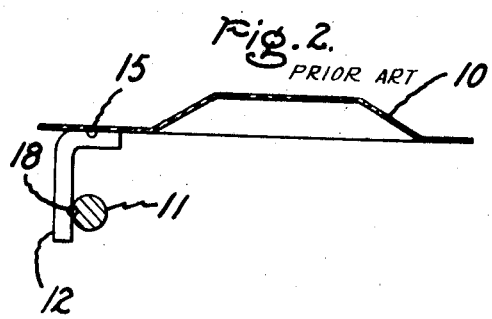
FIG. 2 is a sectional view of the FIG. 1 assembly taken on line 2—2 of FIG. 1.
Figure 3:
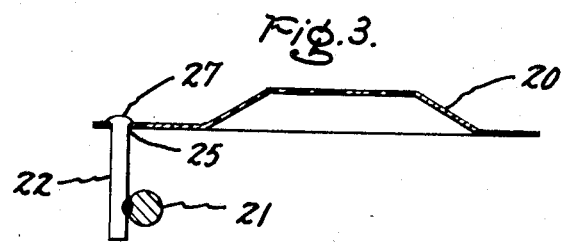
FIG. 3 is a view like that of FIG. 2 of a tungsten reflector and support assembly generally similar to that of FIG. 1 but made in accordance with the method of this invention.
Figure 4:
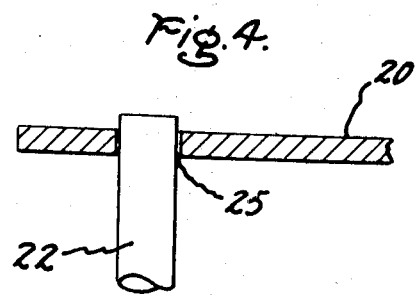
FIG. 4 is an enlarged cross-sectional view of a portion of the assembly of FIG. 3 prior to the arc spot-welding operation, showing in detail the relationship between the joining member and reflector at this stage of the process.
Figure 5:
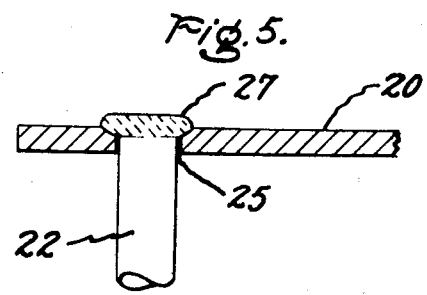
FIG. 5 is a view like that of FIG. 4, showing the relationship of the parts after the arc spot-welding operation has been completed.

The advance in this art represented by the present invention is illustrated in FIGS. 3, 4 and 5. Thus, as shown in FIG. 3, tungsten reflector 20, which is the counterpart of reflector 10, is secured in fixed position and supported by tungsten support rod 21, which is identical to rod 11, and by means of molybdenum wire joining members as shown at 22, the same as wire members 12 and 13. Consequently, the difference between the devices of FIGS. 1 and 2 centers in the difference in the shape of joining wires 12 and 22 and in the fact that the short legs of wires 12 and 13 abut reflector 10, while the free end of wire member 22 extends through opening 25 in sheet 20, which is closed at its upper end by weld 27 comprising frozen meltback of the free end of member 22 and a superficial portion of the surface of sheet 20 surrounding opening 25. These details are shown to better advantage in FIGS. 4 and 5, where the prewelding stage of the assembly is illustrated, as well as the ultimate welded structure.

In the arc spot-welding operations which result in the joining of wire member 22 to the upper or outer surface of reflector 20, the free end of the wire member extending through sheet 20 is flash heated and melted by a tungsten inert-gas arc so that the hot metal of the reflector and the wire member is protected against oxidation. The actual period during which wire 22 and adjacent superficial surface of reflector 20 are in the molten or liquid state is of the order of 1 second or less which, however, is long enough to result in the secure joining by meltback metal of the wire joining member and reflector 20 as a result of molten metal flowing into the space between the wire and the reflector and closing the opening through which the wire extends. The annular seal of weld metal which thus results from the action of the arc and the effect of gravity serves to fasten the parts rigidly together in a structure which is inherently stronger than that of the FIG. 1 design. Also, the integrity of the structure and particularly of weld 27 can readily be determined visually.

Having thus described this invention in such full, clear, concise and exact terms as to enable any person skilled in the art to which it pertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, part of the specifically described embodiments of the invention may be made without departing from the scope of the invention as set forth in what is claimed.

What we claim as new and desire to secure by Letters Patent of the United States is:

1. In the process of joining a refractory metal support wire to a refractory metal regenerative lamp reflector including the steps of positioning the support wire in predetermined spaced relation to the reflector and fastening a refractory metal joining wire to the said support wire and to the reflector to hold the reflector in fixed relative position, the combination of the steps of forming an opening through the reflector, introducing an end of the joining wire in the opening in the reflector, and arc spot-welding the joining wire to the reflector on the side of the reflector facing away from the support wire.

2. The process of claim 1 in which the support wire and reflector are made of tungsten and the joining wire is molybdenum, and the spot-welding operation is conducted with a tungsten electrode and an inert-gas shield to prevent oxidation of the molybdenum joining wire.

3. The process of claim 2 in which the end of the molybdenum joining wire extending through the opening in the tungsten reflector is melted during the spot-welding operation to form an annular seal within the reflector.

* * * * *